US011385902B2

(12) United States Patent
Alon et al.

(10) Patent No.: US 11,385,902 B2
(45) Date of Patent: Jul. 12, 2022

(54) SECURE FIRMWARE MANAGEMENT WITH HIERARCHICAL BOOT SEQUENCE USING LAST KNOWN GOOD FIRMWARE

(71) Applicant: NUVOTON TECHNOLOGY CORPORATION, Hsin-chu (TW)

(72) Inventors: Moshe Alon, Tel-Aviv (IL); Avraham Fishman, Ra'anana (IL); Dan Morav, Herzliya (IL); Eyal Cohen, Kfar Saba (IL); Uri Trichter, Herzliya (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 203 days.

(21) Appl. No.: 16/929,137

(22) Filed: Jul. 15, 2020

(65) Prior Publication Data

US 2021/0149681 A1 May 20, 2021

Related U.S. Application Data

(60) Provisional application No. 62/936,518, filed on Nov. 17, 2019.

(51) Int. Cl.
*G06F 9/44* (2018.01)
*G06F 9/4401* (2018.01)
(Continued)

(52) U.S. Cl.
CPC .............. *G06F 9/4401* (2013.01); *G06F 8/71* (2013.01); *G06F 11/2284* (2013.01);
(Continued)

(58) Field of Classification Search
CPC ...... G06F 9/4401; G06F 8/71; G06F 11/2284; G06F 21/44; G06F 21/577; G11C 7/24
See application file for complete search history.

(56) References Cited

U.S. PATENT DOCUMENTS 7,974,416 B2 * 7/2011 Zimmer ................ G06F 9/4406
713/193
8,291,226 B2 * 10/2012 Chun .................... G06F 21/575
713/176
(Continued)

FOREIGN PATENT DOCUMENTS

EP       1975836 A2    10/2008

OTHER PUBLICATIONS

NIST-FIPS 140-2, "Implementation Guidance for FIPS 140-2 and the Cryptographic Module Validation Program," pp. 1-277, Mar. 28, 2003.
(Continued)

*Primary Examiner* — Zahid Choudhury
(74) *Attorney, Agent, or Firm* — Kligler & Associates Patent Attorneys Ltd

(57) ABSTRACT

A computer system includes one or more memory devices, non-resettable memory elements and a processor. The first memory device is configured to store in the one or more memory devices (i) a first version of a multi-stage bootstrap program for bootstrapping the computer system, the bootstrap program including a self-test program that tests the bootstrap program, and (ii) a second version of the bootstrap program known to be trustworthy. The non-resettable memory elements are configured to store non-resettable indicators including at least a self-test-request indicator and a self-test-passed indicator. The processor is configured to retrieve the first version of the bootstrap program, and, if the first version is at least as recent as the trustworthy second version, to bootstrap the computer system securely using the first version and the non-resettable indicators.

17 Claims, 6 Drawing Sheets

(51) Int. Cl.
*G06F 11/22* (2006.01)
*G06F 8/71* (2018.01)
*G11C 7/24* (2006.01)
*G06F 21/57* (2013.01)
*G06F 21/44* (2013.01)

(52) U.S. Cl.
CPC ............ *G06F 21/44* (2013.01); *G06F 21/577* (2013.01); *G11C 7/24* (2013.01)

(56) References Cited

U.S. PATENT DOCUMENTS

| | | | |
|---|---|---|---|
| 8,443,203 B2* | 5/2013 | Park | G06F 21/575 713/187 |
| 8,914,626 B1* | 12/2014 | Adogla | G06F 9/4401 709/227 |
| 8,918,879 B1* | 12/2014 | Li | G06F 21/568 718/1 |
| 2007/0240224 A1* | 10/2007 | Agrawal | G06F 21/6227 726/25 |
| 2008/0288962 A1* | 11/2008 | Greifeneder | G06F 9/44536 713/2 |

OTHER PUBLICATIONS

FIPS PUB 198-1, "The Keyed-Hash Message Authentication Code (HMAC)," pp. 1-13, Jul. 2008.
NIST-FIPS 180-4, "Secure Hash Standard (SHS)," pp. 1-36, Aug. 2015.
"UEFI (Unified Extensible Firmware Interface Forum) specifications," version 2.7, Errata A, pp. 1-2575, Aug. 2017.

* cited by examiner

SECURE FIRMWARE MANAGEMENT WITH HIERARCHICAL BOOT SEQUENCE USING LAST KNOWN GOOD FIRMWARE

CROSS-REFERENCE TO RELATED APPLICATIONS

This application claims the benefit of U.S. Provisional Patent Application 62/936,518, filed Nov. 17, 2019, whose disclosure is incorporated herein by reference.

FIELD OF THE INVENTION

The present invention relates generally to secure recovery of computer systems, and particularly to methods and systems for secure firmware management of computer systems.

BACKGROUND OF THE INVENTION

Computer systems may use Flash memory to store non-volatile data, e.g., boot code. In some cases, the Flash memory also provides persistent storage support for critical functions such as security and power management. The boot code that is stored in flash memories is referred to as Firmware.

Numerous methods have been devised to verify the reliability of the firmware and protect it against attacks. Example techniques can be found, for example, in "SECURITY REQUIREMENTS FOR CRYPTOGRAPHIC MODULES, Implementation Guidelines," NIST-FIPS 140-2, initially released on Mar. 28, 2003; in "The Keyed-Hash Message Authentication Code," FIPS PUB 198-1, July 2008; in "Secure Hash Standard (SHS)," NIST-FIPS 180-4, August, 2015; and in "UEFI (Unified Extensible Firmware Interface Forum) specifications," version 2.7 (Errata A), August 2017. All four documents are incorporated herein by reference.

SUMMARY OF THE INVENTION

An embodiment of the present invention that is described herein provides a computer system including one or more memory devices, non-resettable memory elements and a processor. The one or more memory devices are configured to store (i) a first version of a multi-s age bootstrap program for bootstrapping the computer system, the bootstrap program including a self-test program that tests the bootstrap program, and (ii) a second version of the bootstrap program that is known to be trustworthy. The non-resettable memory elements are configured to store non-resettable indicators that are retained regardless of resetting of the computer system, the non-resettable indicators including at least (i) a self-test-request indicator that requests running of the self-test program, and (ii) a self-test-passed indicator indicative of whether the self-test program passed or failed. The processor is configured to retrieve the first version of the bootstrap program, and, if the first version is at least as recent as the trustworthy second version, to bootstrap the computer system securely using the first version and the non-resettable indicators.

In some embodiments, the one or more memory devices include a first memory device configured to store the first version, and a second memory device configured to store the second version. In an embodiment, if the first version is less recent than the trustworthy second version, the processor is configured to initiate a recovery process that copies the trustworthy second version to replace the first version. In a disclosed embodiment, if the first version is more recent than the trustworthy second version, the processor is configured to read the self-test-passed indicator, and, if the self-test-passed indicator is cleared, to set the self-test-request indicator and then reset the computer system.

In an example embodiment, if the first version is more recent than the trustworthy second version, the processor is configured to read the self-test-passed indicator and the self-test-request indicator, and, if the self-test-passed indicator is cleared and the self-test-request indicator is set, to run the self-test program, clear the self-test-request indicator, set or clear the self-test-passed indicator depending a result of the self-test program, and then reset the computer system.

In an embodiment, the non-resettable indicators further include an update-approve indicator, and, if the first version is more recent than the trustworthy second version, the processor is configured to read the self-test-passed indicator and the update-approve indicator and, if the self-test-passed indicator is set but the update-approve indicator is cleared, to hierarchically authenticate the first version of the bootstrap program, set or clear the update-approve indicator depending a result of authentication of the first version, and then reset the computer system. In a disclosed embodiment, the non-resettable indicators further include an update-approve indicator, and, if the first version is more recent than the trustworthy second version, the processor is configured to read the self-test-passed indicator and the update-approve indicator and, if both the self-test-passed indicator and the update-approve indicator are set, to replace the trustworthy second version with the first version, and then reset the computer system. In an embodiment, at least a memory region storing the second version is write-protected during run-time of the computer system.

There is additionally provided, in accordance with an embodiment of the present invention, a method in a computing system. The method includes storing in one or more memory devices of the computing system (i) a first version of a multi-stage bootstrap program for bootstrapping the computer system, the bootstrap program including a self-test program that tests the bootstrap program, and (ii) a second version of the bootstrap program, which is known to be trustworthy. Non-resettable indicators, which are retained regardless of resetting of the computer system, are stored in non-resettable memory elements of the computing system. The non-resettable indicators include at least (i) a self-test-request indicator that requests running of the self-test program, and (ii) a self-test-passed indicator indicative of whether the self-test program passed or failed. Using a processor of the computing system, the first version of the bootstrap program is retrieved, and, if the first version is at least as recent as the trustworthy second version, the computer system bootstrapped securely using the first version and the non-resettable indicators.

There is further provided, in accordance with an embodiment of the present invention, a computer software product. The product includes a tangible non-transitory computer-readable medium in which program instructions are stored, which instructions, when read by a processor in a computing system, cause the processor to store in one or more memory devices of the computing system (i) a first version of a multi-stage bootstrap program for bootstrapping the computer system, the bootstrap program including a self-test program that tests the bootstrap program and (ii) a second version of the bootstrap program that is known to be trustworthy, to store, in non-resettable memory elements of the computing system, non-resettable indicators that are retained regardless of resetting of the computer system, the non-resettable indicators including at least (i) a self-test-request indicator that requests running of the self-test program, and (ii) a self-test-passed indicator indicative of whether the self-test program passed or failed, to retrieve the first version of the bootstrap program, and, if the first version is at least as recent as the trustworthy second version, to bootstrap the computer system securely using the first version and the non-resettable indicators.

The present invention will be more fully understood from the following detailed description of the embodiments thereof, taken together with the drawings in which:

DETAILED DESCRIPTION OF EMBODIMENTS

Overview

Figure 1:
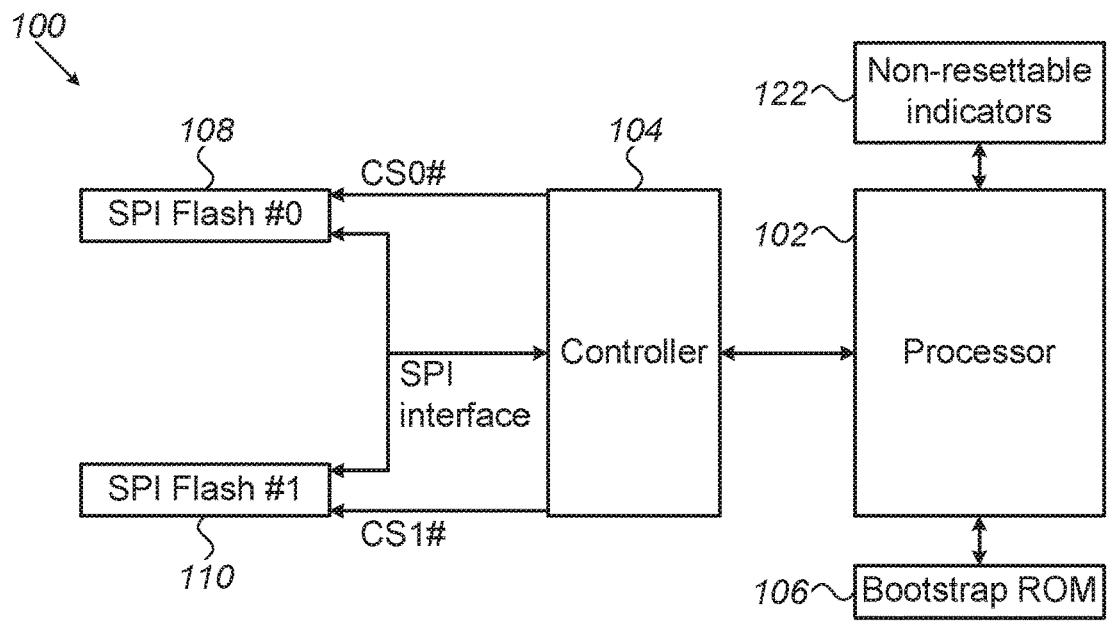
FIG. 1 is a block diagram that schematically illustrates a computer system, in accordance with an embodiment of the present invention.

Computer systems according to embodiments of the present invention comprise flash memory and a Read-Only-Memory (ROM). In embodiments, the boot program may comprise hierarchical software layers, from a small most-trusted layer 0, and up to an outer layer, which is larger and less trusted (in the description and the drawings herein, we will sometimes refer to boot layers as boot levels).

When the computer system powers up, an initial boot code that is stored in the ROM executes a boot program ("layer-0 boot") and authenticates a "layer-1 boot" program (the authentication is typically done using cryptographic keys and digital signatures). Next, layer-1 boot executes, and authenticates the next layer, which may be stored in the flash or in other system memory (which is typically non-volatile). This process continues hierarchically until a "layer n-1 boot" program executes and authenticates a "layer-n boot", which is the final boot stage. In some embodiments, the computer system is a Linux system, and layer-n boot is referred to as "Linux boot". Such hierarchical secure boot is described, for example, in NIST-FIDS Publication 180-4, which was cited above.

In some embodiments according to the present invention, a computer system may comprise a processor which is configured to execute computer programs including boot codes, and two flash memories—a first flash memory that is used for bootstrapping (will be referred to hereinbelow as "Flash0"), and a second flash memory that stores the last (i.e., most recent) known good firmware code, and may be used for recovery ("Flash1"). In the present context, the term "good firmware code" means firmware code that has been authenticated successfully and is known to be reliable and stable. According to embodiments, if boot from Flash0 fails, the computer system will attempt to boot from Flash1.

The computer system further comprises a controller, which routes flash accesses from the processor to either flash0 or flash1, according to a boot-from-flash0/1 register bit that the controller may include. When Flash-0 is programmed with a new firmware code, the processor authenticates the code. If the authentication succeeds, the processor copies new firmware code into Flash-1, and the computer system boots from Flash-0. If the authentication fails, the processor copies the last-known-good firmware from. Flash-1 to Flash-0, thus, scrapping the new firmware. The computer system will then boot from Flash-0.

Although the embodiments described herein mainly use flash memories, the techniques presented herein are not limited to flash memories, and alternative embodiments may use any other suitable memory devices. In the description hereinbelow, the terms flash memories and memory devices are used interchangeably.

In some cases, the protection provided by the hierarchical authentication process described above may not be enough. As the size of boot programs grows the vulnerability of the code to attacks increases and the security decreases. In addition, flash programming may be interrupted by power failures or power glitches, resulting in undetermined and potentially unstable boot code. In embodiments according to the present invention, additional protection is provided.

According to embodiments of the present invention, one or more bits of the flash device may be used to indicate successful flash programming (will be referred to hereinbelow as "tag-bit", or "VALID-TAG"). According to an embodiment, flash programming starts with the setting of the tag-bit to a first binary value (e.g., logic 1), to indicate that flash programming has failed. Only when programming is completed successfully, the tag-bit is set to a second binary value (e.g., logic 0), indicating that flash programming has succeeded. Thus, if power failure occurs while the flash is being programmed, the tag will indicate programming failure, and appropriate measures will be taken (example to such measures will be described below, with reference to example embodiments).

In some embodiments according to the present invention, the computer system comprises one or more memory elements, which are configured to be programmed by the processor to a binary value, and to retain the programmed binary value as long as the processor supply voltage is within a predefined voltage range, including when other memories of the processor are reset. Such memory elements will be referred to hereinbelow as "non-resettable indicators." In embodiments, various booting operation may comprise setting of one or more of the non-resettable indicators, and, may conclude by resetting the processor. Thus, when the processor boots, the processor may continue a boot sequence that was started in a previous boot session by reading one or more non-resettable indicators.

In an embodiment, the highest hierarchy level of the boot program comprises a self-test program that verifies the functionality of the boot code. When the computer system boots from a new boot code (that is stored in Flash 0), a non-resettable indicator (will be referred to hereinbelow as "Self-Test-Request indicator) may be set, indicating that a self-test is requested. If the highest hierarchy level of the boot code detects that the Self-Test-Request indicator is set, the processor will execute the self-test program, and store the result of the self-test in another non-resettable indicator ("Self-Test-Passed" Indicator), and then reset. Thus, although the highest hierarchy level of the firmware is large and may be vulnerable to attacks, any disrupting of register values or volatile-memory contents that the highest hierarchy level may cause will be reset; the only requirement is that the self-test part of the firmware will store a true result in the non-resettable self-test-passed indicator.

In some embodiments, a fault, malicious or accidental, in boot layers that are higher than the lowest layer may falsely set the Self-Test-Passed indicator. According to an embodiment, the processor will update Flash-1 (that is copy the boot program from flash-0 to flash-1) only if an Update-Approve non-resettable indicator is set. In an embodiment, to prevent firmware changes after self-test completion, the processor responds to a Self-Test-Passed indicator by hierarchically authenticating all boot levels, and, in response to successful authentication, setting the Update-Approve non-resettable indicator and resetting the processor.

In some embodiments, the boot-from-flash0/1 register that was described above is a non-resettable indicator that selects the source of the boot code to flash0 or, if boot from flash0 fails, to flash1; in yet other embodiments, a Lock-Flash1-Writes non-resettable indicator prevents writing to flash1. (The non-resettable Boot-from-Flash0/1 and Lock-Flash1-Writes indicators will be described with reference to example embodiments hereinbelow.)

In summary, in a computer system that comprises two boot flash devices and a controller, secure hierarchical boot may be achieved, using non-resettable indicators, a self-test program and VALID-TAGS that are stored in the flash devices.

SYSTEM DESCRIPTION

FIG. 1 is a block diagram 100 that schematically illustrates a computer system, in accordance with an embodiment of the present invention. The computer system comprises a processor 102, a controller 104, a Bootstrap Read-Only-Memory (ROM) 106, a first SPI-flash device 108 ("Flash0"), a second SPI-flash device 110 ("Flash1") and non-resettable indicators 112. In embodiments, computer system 100 may comprise other sub-units that are not shown; including (but not limited to) peripherals, communication ports and memories.

Processor 102 is configured to run programs that are stored in memories, including bootstrap programs that may be stored in Bootstrap ROM 106 and in Flash-0 108. Controller 104 is coupled to Flash-0 and to Flash-1 through a Serial-Processor-Interface (SPI) bus, including Chip-Select (CS) CS0 and CS1 wires, which control Flash0 and Flash1, respectively (in the example embodiment described in FIG. 1, the polarity of the CS wires is negative ("active-low"), and, hence, the CS wires are designated CS0# and CS1#).

Non-Resettable Indicators 122 are registers that maintain their logic value when the computer system is reset. In embodiments according to the present invention, the boot sequence may comprise one or more resetting of the computer system, including the resetting of numerous registers; the non-resettable indicators, however, retain their values during reset.

In embodiments according to the present invention, the non-resettable indicators may comprise:

a Boot-from-Flash0/1 indicator, which determines from which of the two flash devices the processor runs the boot code;

Lock-Flash1-Writes indicator, which, when set, prevents all writes to flash1;

a self-test-request indicator, which, if observed by the Linux level of the boot, causes the processor to run a self-test program;

a self-test-passed indicator, which indicates to the lower boot levels that the self-test passed successfully; and an update-approve indicator, which, when observed by level-0 of the firmware, causes the processor to update flash1 with the contents of flash0.

According to the example embodiment presented in FIG. 1, Flash1 stores a version of the firmware program that is known to be good whereas Flash0 stores the firmware code that is in use by the computer system. In some embodiments, the firmware code comprises a self-test program that checks the functionality of the firmware boot code.

In embodiments, if a new firmware is programmed in Flash0, the processor, when booting, authenticates the new firmware and checks whether the self-test passes. If the new firmware fails to authenticate or if the self-test fails, the new firmware is deemed faulty and the computer system will recover the last known firmware by copying Flash1 to Flash0, scrapping the new firmware.

If the authentication succeeds and the self-test passes, the new firmware is deemed good; the computer system will copy the new firmware to Flash1, to replace the last known-good firmware.

According to embodiments of the present invention, the top level of the bootstrap program, although authenticated, is prone to attacks and may be faulty. Hence, when the top level of the firmware executes, it is imperative to prevent the processor from changing the contents of Flash1, which may block any recovery option. In embodiments, only the lower levels of the firmware (typically ROM based) can change the contents of Flash1. Hence, damage that an infected firmware level that is hierarchically higher, is limited. As would be appreciated, the lower the level which Flash1 is updated, the safer the solution is. In some embodiments, level-1 or other low level can update Flash1; this may be less secure but still safer than letting a high-level firmware update Flash1.

After running the self-test, the firmware must reset the computer system, undoing any damage that it may have caused. The result of the self-test, therefore, is signaled in a non-resettable indicator, to be used by the low-level firmware. As the self-test part of the higher-level firmware is relatively small, the security that computer systems according to embodiments of the present invention may achieve is high.

Thus, according to the example embodiment described in FIG. 1, a computer system may detect an insecure or a non-functional firmware, by running authentication and self-test. The computer system resets after the self-test, undoing any damage that higher firmware layers may have caused. The results of the self-test are signaled to the lower firmware layers by non-resettable indicators. If an insecure or a non-functional firmware is detected, the computer system reverts to the last known firmware by copying Flash-1 to Flash0. If both the authentication and the self-test pass, the new firmware is deemed good and the computer system copies the firmware to Flash-1, replacing the former last-known-good firmware.

As would be appreciated, the structure of computer system 100 described above is cited by way of example. Computer systems in accordance with the disclosed techniques are not limited to the description hereinabove. In alternative embodiments, for example, bootstrap ROM 106 and/or controller 104 may be embedded in Processor 102. In an embodiment, Flash0 and/or Flash1 may be coupled to controller 104 by buses other than SPI, serial or parallel. In some embodiments, Flash0 and/or Flash1 may be replaced by other memory technologies, for example, Ferro-Electric RAM (F-RAM) or Magneto-resistive RAM (M-RAM).

In an embodiment, more than a single version of Flash1 may be present, for redundancy.

Figure 2:
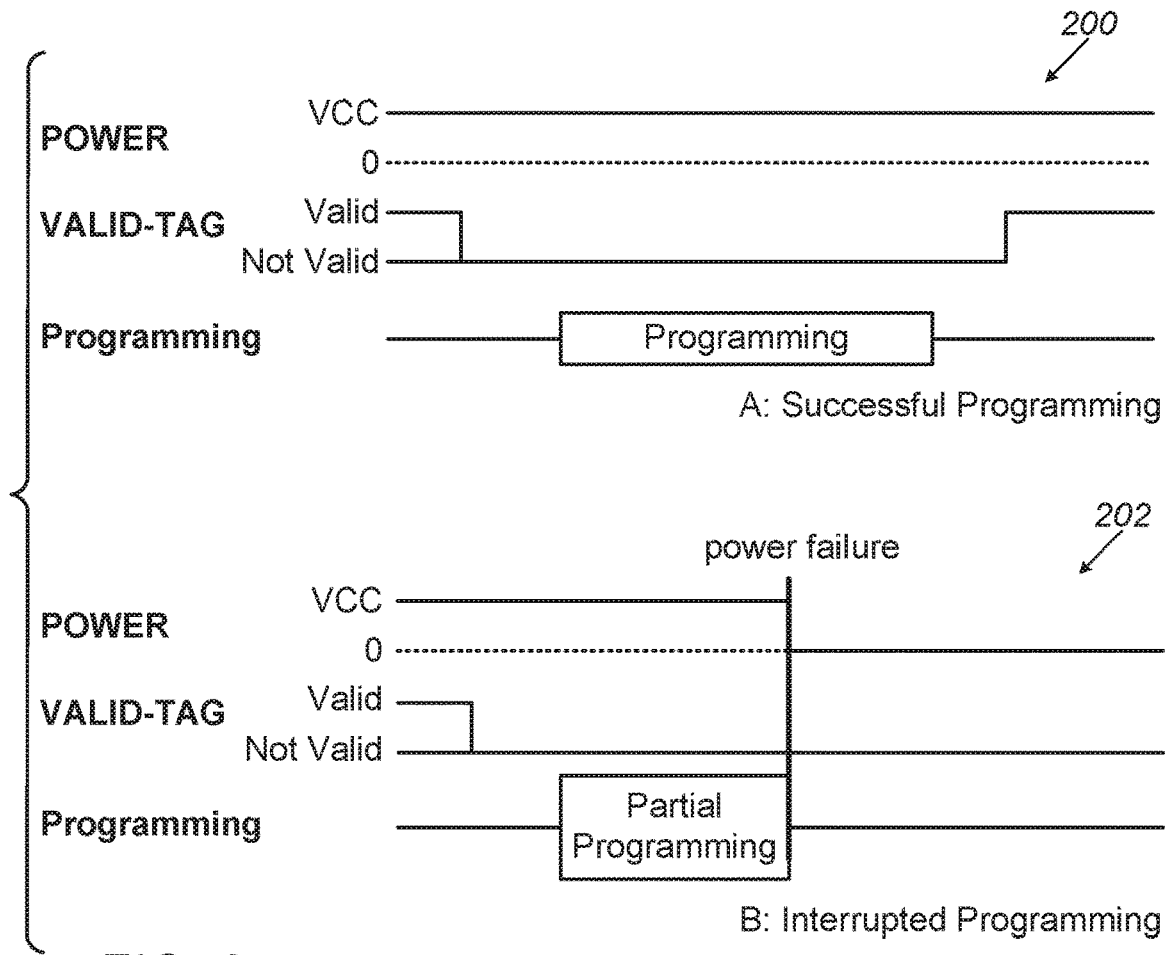
FIG. 2 is a timing waveform that schematically describes programming of a flash memory, in accordance with an embodiment of the present invention.

FIG. 2 is a timing waveform that schematically describes programming of a flash memory, in accordance with an embodiment of the present invention. A Non-volatile storage bit (referred to as "VALID-TAG"), which is typically stored in the flash, is used to indicate that the programming of the flash is valid Waveform 100 illustrates the timing waveform that correspond to a normal flash programming session. The CPU clears the VALID-TAG bit to indicate that programming has failed. Then, the processor programs the flash, and only after programming is completed, the processor sets the tag, indicating successful programming.

Timing Waveform 202 illustrates the timing waveform of a flash programming session that was aborted due to power failure. The VALID-TAG is cleared prior to the programming; during the programming, the voltage on the Power input drops, aborting the programming. The VALID-TAG remains cleared, indicating programming failure.

Thus, according to the example embodiment described above with reference to FIG. 2, a set VALID-TAG indicates successful flash programming, and any programming failure, including untimely abortion, e.g. as a result of a power failure, will result in a cleared VALID-TAG, and failed programming indication.

In embodiments wherein the VALID-TAG is stored in the Flash, the logic values of a cleared and a set VALID-TAG may be determined according to the logic level of the flash technology of choice after an Erase operation. For example, if an Erase operation results in setting the flash bits to logic-0, a VALID-TAG at logic-1 will indicate successful programming.

Figure 3:
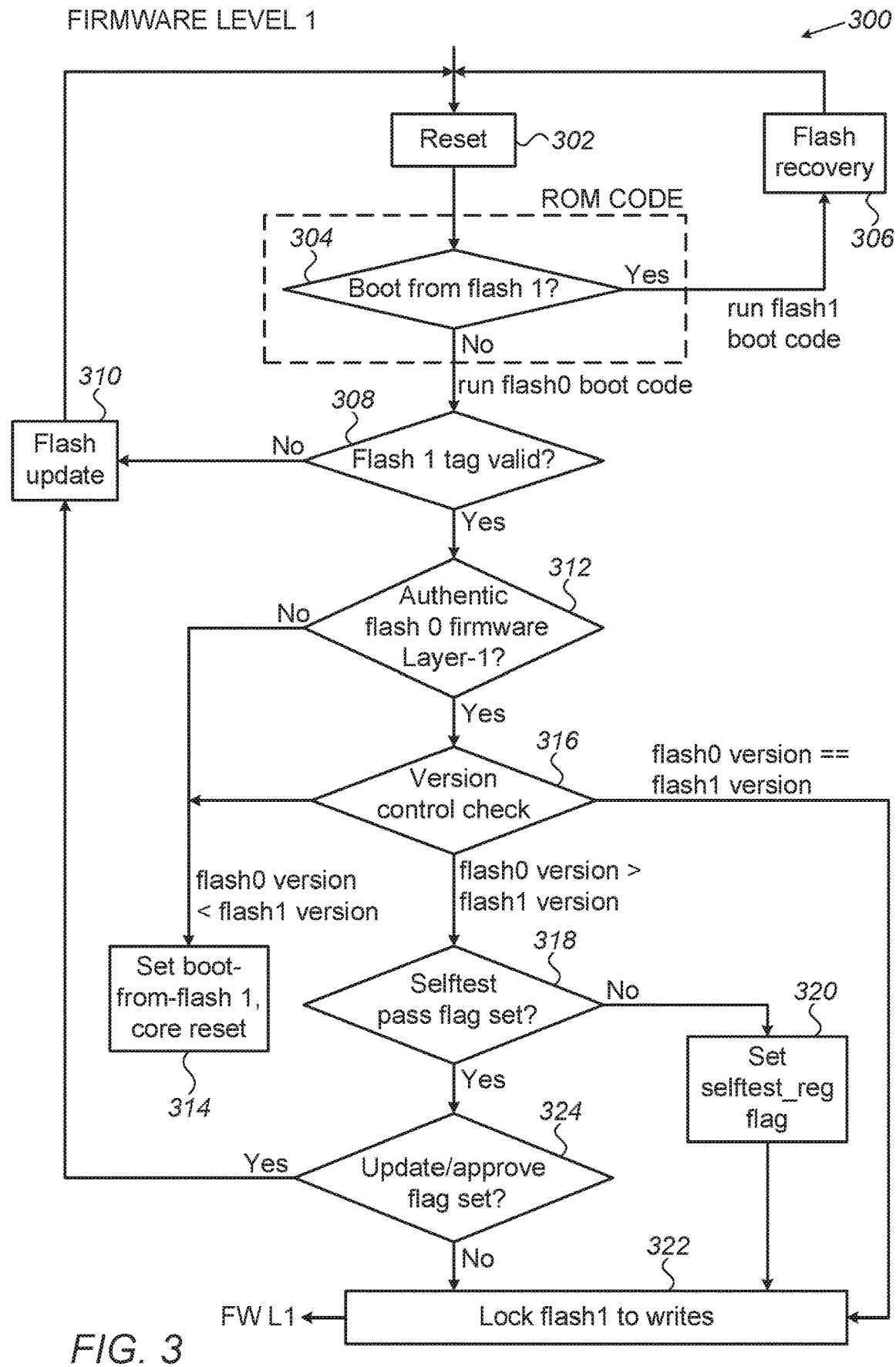
FIG. 3 is a flow chart that schematically illustrates a method for bootstrapping, in accordance with embodiments of the present invention.

FIG. 3 is a flow chart 300 that schematically illustrates a method for bootstrapping, in accordance with embodiments of the present invention. The flowchart is executed by Processor 102 (FIG. 1).

When flow 300 starts, flash0 may store a new boot firmware that is different from the firmware in flash1. This can happen if a new flash device is inserted in the system, or, in runtime, a new firmware is programmed in flash0 prior to the reset that precedes flow 300 (This latter case will be described hereinbelow, with reference to FIG. 8). Additionally, the firmware in flash0 may be different from the firmware in flash1 if the programming of flash0 is not complete (and may continue in flow 300, as will be described hereinbelow).

The flow starts at a Resetting step 302, wherein the computer system is reset. It is important to note that when the system is reset, the contents of all registers is cleared, except for the non-resettable indicators, which are handled by the booting method disclosed herein. Thus, any damage that a compromised program may have created will be undone when the system reboots.

After the reset of step 302, the processor enters a Check-Booting-From-Flash1 step 304 and checks the value of the non-resettable "boot-from-flash0/1" indicator. If, in step 304, the non-resettable "boot-from-flash0/1" indicator indicates that the processor should boot from flash1, the processor will enter a Flash Recovery flow 306, which comprises copying flash1 to flash0, and then re-enter Reset step 302 (Flash Recovery Flow 306 will be described below, with reference to FIG. 4). Note that, as the boot-from-flash0/1 indicator indicates that boot is to be done from flash1, flash recovery flow 306 is run from code that is stored in flash1. If the indicator indicates boot from flash0, further boot instructions will be run from flash0 (in some embodiments, ROM code may manage the entire recovery flow, copying the code from flash1 to flash0 and then resetting the system, so as to boot from flash0).

If, in step 304, the indicator indicates booting from flash0, the processor will enter a Checking Flash1 Tag step 308, wherein the processor checks the value of Flash1 VALID-TAG.

If, in step 308, flash1 VALID-TAG is not set (and, hence, does not indicate that flash1 has been successfully programmed), the processor will enter a Flash-Update flow 310, which comprises copying flash0 to flash 1, and then re-enter Reset step 302 (Flash Update flow 310 will be described below, with reference to FIG. 5).

If, in step 308, flash-1 VALID-TAG is set (indicating successful Flash1 programming), the processor enters a Flash0 authentication step 312, and authenticates level1 of the firmware. If, in step 312, the authentication fails, the processor will enter a Set-Boot-From-Flash1 step 314, wherein the processor will set the boot from flash 0/1 indicator to indicate booting from flash-1, and then reset. In some embodiments, the core resetting of step 314 is identical to reset step 302. In other embodiments, the reset in step 314 may be a shorter process, for example, reset step 302 may comprise resetting clock sources like Phase-Locked-Loops, whereas the reset of step 314 may comprise reset of registers only.

If, in step 312, the authentication passes, the processor enters a Version Control step 316, wherein the processor compares the version code of the firmware that is stored in flash0 to the version code of the firmware stored in flash1. According to embodiments of the present invention, part of a firmware code is a version identifier ("version code"). The identifier may comprise a numerical version number, or, for example, a time stamp. The version code should be built such that the processor can tell which of two firmware versions is more recent. For example, if the version code is an integer that is incremented in each new version, a firmware code with a version code that is arithmetically larger than the version code of another firmware version is more recent.

If, in step 316, flash0 version code is smaller than flash1 version code, the new firmware that is stored in flash0 is not the most recent firmware. In this case, the processor will enter Set-Boot-From-Flash1 step 314. If, in step 316, the version codes of both flash1 and flash0 are the same, the new firmware has been approved and flash1 has been updated. In this case, the processor enters a Lock-Flash1-and-Go step 322, whereas the processor sets the non-resettable Lock-Flash1-Writes indicator, and then proceeds to firmware Layer 1 (and, thereafter, to higher levels, until the Linux firmware is executed). The locking of flash1 to writes increases the security of the system and prevents attacks on the recovery flash from higher levels of the firmware and from any applications.

If, in step 316, the version code of the firmware that is stored in flash0 is greater than the version code of the firmware stored in flash1, flash0 stores a new firmware, which needs to be verified. The processor will then enter a checking-self-test-passed step 318, and check if the self-test-passed non-resettable indicator is set. If the self-test-passed indicator is not set, the processor will enter a Setting-Self-Test-Request step 320, and, set the non-resettable Self-Test-Request indicator to indicate self-test request. The processor will then enter Lock-Flash1-and-Go step 322. In this case, since the self-test-request indicator is set, when the Linux firmware level is reached the Linux level will execute a self-test and then reset (as will be described below, with reference to FIG. 8).

If, in step 318, the self-test-passed non-resettable indicator is set, the processor will enter a Checking Update-Approve step 324, and check if the non-resettable Update-Approve indicator is set. If the indicator is not set, the processor will enter the Lock-Flash1-and-Go step 322. In this case, since the self-test-passed indicator is set and the update-approve indicator is not set, when the Linux firmware level is reached the level just below the Linux level will set the update-approve non-resettable indicator, and then reset (as will be described below with reference to FIG. 8).

If, in step 324, the update/approve indicator is set the processor will enter flash-update flow 310.

After step 322, the processor executes firmware layer 1, which will be described below with reference to FIG. 6.

Figures 4, 5:
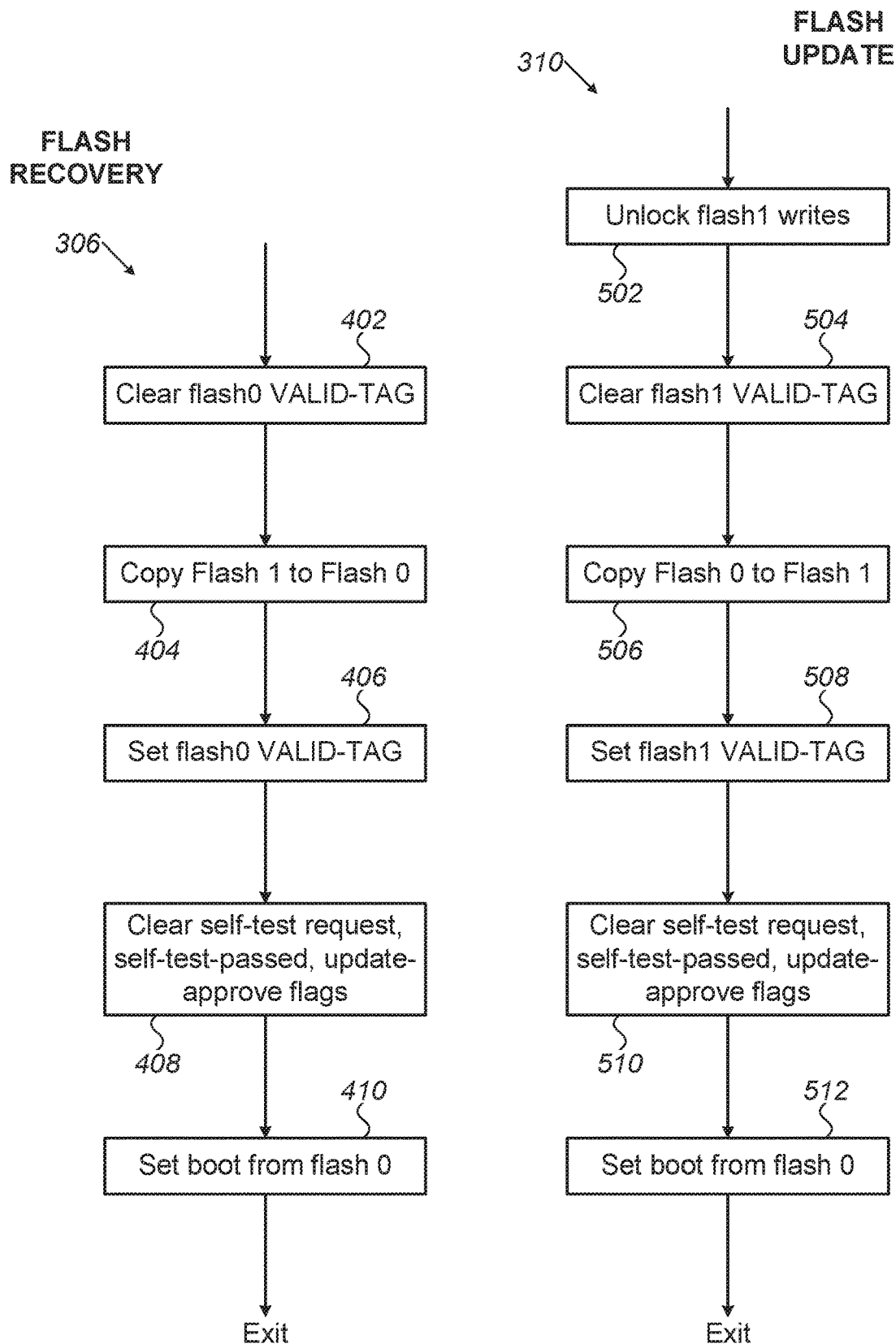
FIG. 4 is a flow chart that schematically illustrates a flash recovery method, in accordance with embodiments of the present invention.
FIG. 5 is a flow chart that schematically illustrates a flash update method in accordance with embodiments of the present invention.

FIG. 4 is a schematic illustration of the flow of a flash recovery method (306 in FIG. 3), in accordance with embodiments of the present invention. The flash recovery flow is executed by processor 102 (FIG. 1), when the new firmware that is stored in flash0 does not pass authentication or self-test. As flow 306 is entered when the boot from flash0/1 indicator indicates boot from flash1, the code for the flash recovery flow is the code that is stored in flash1.

The flow starts at a Clearing-Flash0-VALID-TAG step 402, wherein the processor clears the VALID-TAG of flash0, in preparation for flash0 programming. Next, the processor enters a Copying-Flash1-to-Flash0 step 404, wherein the firmware that is stored in flash1—the last known good firmware—is copied to flash0, scrapping the new firmware or a corrupted old firmware (which has failed authentication or self-test).

As would be appreciated, step 404 may comprise a plurality of steps, including but not limited to erasing of flash sectors, programming sectors of the flash, functional tests, and margin tests. The steps that are needed may differ according to the flash technology of choice and are beyond the scope of the present invention.

After step 404, the processor enters a Setting-Flash0-VALID-TAG step 406 and sets the Valid Tag, indicating that flash programming has been completed successfully (as described above, with reference to FIG. 2, the value of Valid-Tag will not be compromised, even if power is interrupted during the programming process). The processor then enters a Clearing-Indicators step 408, and clears the non-resettable Self-Test-Request, Self-Test-Passed and Update-Approve indicators. (Each of the non-resettable indicators that are cleared in step 408 may or may not be already cleared, according to steps that precede the flash-recovery flow.)

After step 408 the processor enters a Setting-boot-from-flash0 step 410, sets the Boot-from-Flash0/1 indicator to indicate booting from flash 0, and exits the flow (e.g. enters Reset step 302, FIG. 3).

FIG. 5 is a schematic illustration of the flow (310, FIG. 3) of a flash update method in accordance with embodiments of the present invention. The flow is executed by processor 102 (FIG. 1). The flow starts at an Unlocking-Flash1-to-Write step 502, wherein the processor clears the non-resettable Lock-Flash1-Writes indicator, so that flash0 could be copied to flash1. Next, the processor enters a Clearing-Flash1-VALID-TAG step 504, wherein the processor clears the VALID-TAG of flash1, in preparation for flash1 programming. The processor then enters a Copying-Flash1-to-Flash0 step 506, and copies the contents of flash0 to flash1, updating the last-known-good firmware. As would be appreciated, step 506 may comprise a plurality of steps, including but not limited to erasing of flash sectors, programming sectors of the flash, functional tests, and margin tests. The steps that are needed may differ according to the flash technology of choice and are beyond the scope of the present invention.

After step 506, the processor enters a Setting-Flash1-VALID-TAG step 508 and sets the Valid Tag, indicating that flash programming has been completed successfully (as described above, with reference to FIG. 2, the value of Valid-Tag will not be compromised, even if power is interrupted during the programming process).

The processor then enters a Clearing-Indicators step 510, and clears the non-resettable Self-Test-Request, Self-Test-Passed and Update-Approve indicators. (Each one of the non-resettable indicators that are cleared in step 510 may or may not be already cleared, according to steps that precede the flash-recovery flow.)

After step 510, the processor enters a Setting-Boot-from-Flash0 step 512, wherein the processor sets the non-resettable Boot-From-Flash0/1 indicator to indicate booting from flash0. Thereafter, flow 310 ends (and the processor enters reset step 302, FIG. 3).

Figure 6:
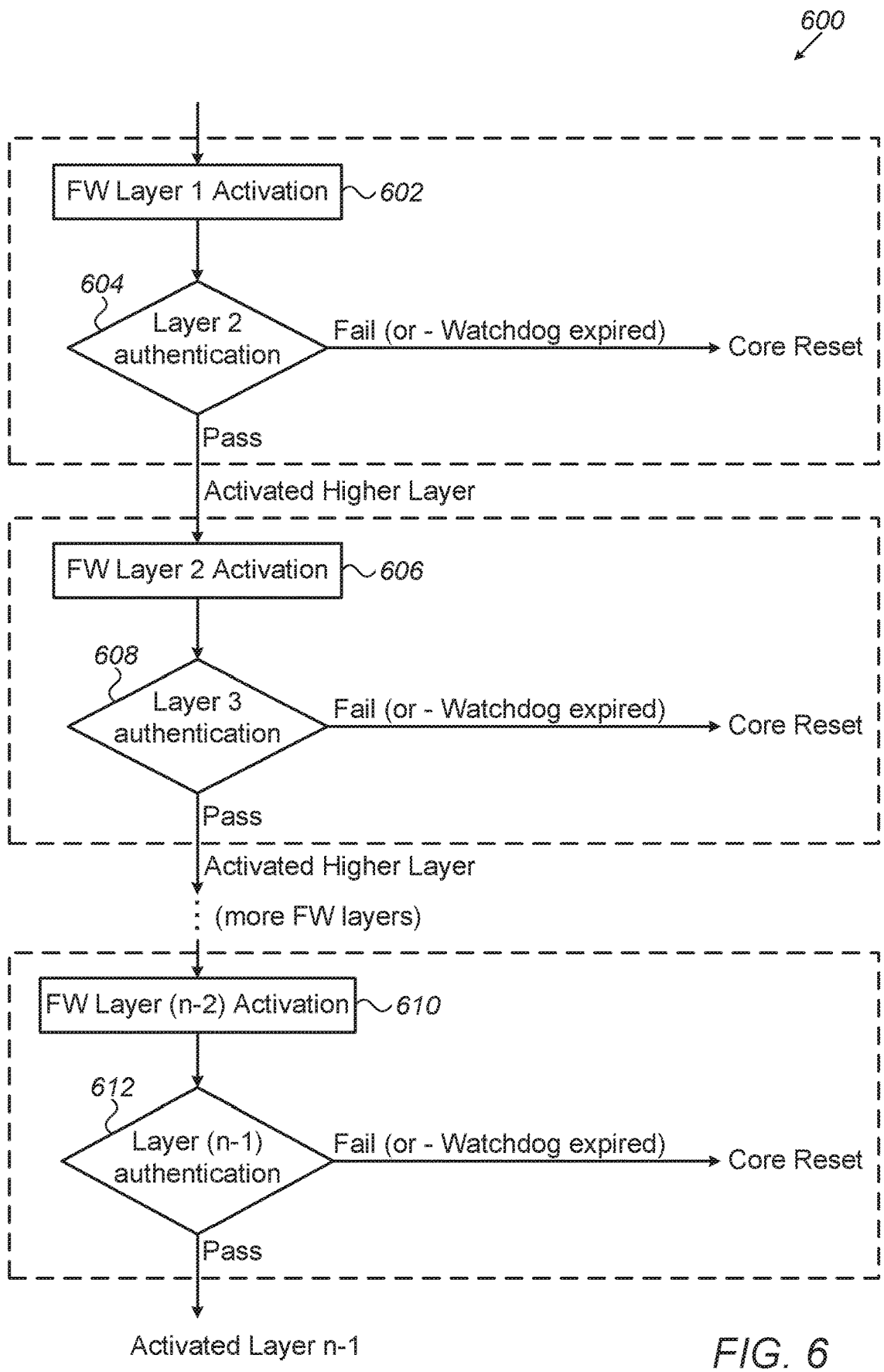
FIG. 6 is a flow chart that schematically illustrates a hierarchical authentication method, in accordance with embodiments of the present invention.

FIG. 6 is a schematic illustration 600 of the flow of a hierarchical authentication method, in accordance with embodiments of the present invention. the flow executed by processor 102 (FIG. 1), which enters the flow after step 322 (FIG. 3). The flow starts at a Layer-1-Activation step 602, wherein the processor starts executing the layer-1 boot code that is stored in Flash 0. Next, the processor enters a Layer-2-Authentication step 604, wherein the processor authenticates the next bootstrap layer (for example, checking a digital signature). If the authentication fails, or, if a watchdog timer (WDG) has expired, the processor will execute a Core Reset. If, in step 604, layer 2 is authenticated, the processor will enter an Activating Layer-2 step 606, activate boot layer 2, and enter an Authenticating Layer-3 step 608.

The process of activating a layer, authenticating the next layer and then activating the next layer, will continue until, in an Activating-layer-n-2 step 610, the processor will activate layer n-2 (n is the total number of bootstrap layers). The processor will then enter an Authenticating-Layer-n-1 step 612, authenticate layer n-1 and, if the authentication passes and the WDG has not expired, enter layer n-1 activation (which will be described with reference to FIG. 7).

Figure 7:
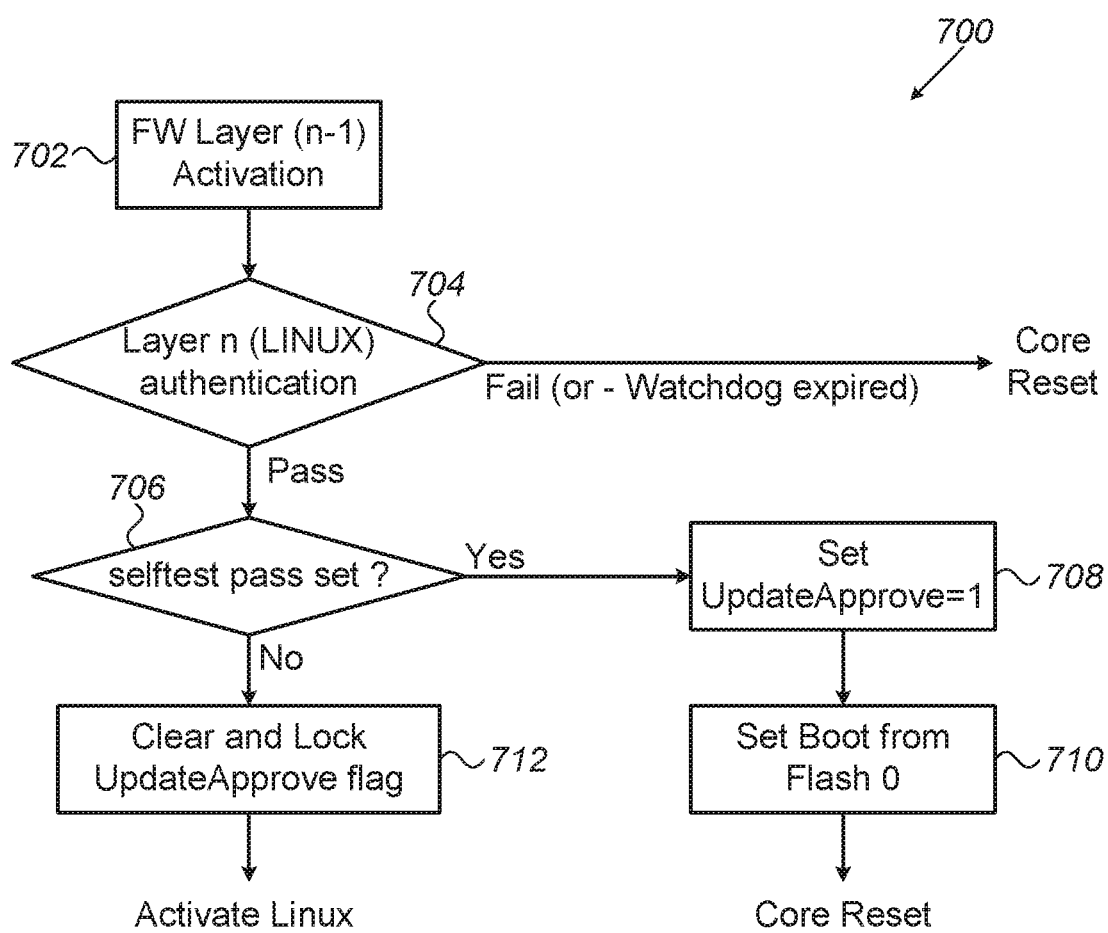
FIG. 7 is a flow chart that schematically illustrates a Linux level authentication method, in accordance with embodiments of the present invention.

FIG. 7 is a schematic illustration of the flow of a Linux level authentication method 700, in accordance with embodiments of the present invention. The flow is executed processor 102 (FIG. 1), following step 612 (FIG. 6).

The flow starts at a Layer-n-1-Activation step 702, wherein the processor activates layer n-1 (the one below Linux). Next, the processor enters an Authenticating-Linux-Layer step 704, wherein the processor authenticates the Linux layer (for example, by checking a digital signature). If the authentication fails, or if a watchdog timer expires, the processor will reset the core; if the authentication succeeds, the processor will enter a checking-self-test-passed indicator 706.

The non-resettable self-test-passed indicator is set only if self-test has been successfully executed by the Linux layer. As described hereinabove, a set Self-Test-Passed indicator should not trigger flash1 update layer 0), because the Linux layer must be authenticated. However, in step 706, the Linux layer has been authenticated (step 704) and hence, if the self-test-passed indicator is set, flash1 update should be initiated. Therefore, the processor, in step 706, if self-test-passed is set, will enter a Setting-Update-Approve step 708 and set the non-resettable update-approve indicator; then, in a Setting-Boot-from-Flash0 step 710, set the non-resettable Boot-from-Flash0/1 indicator to indicate booting from flash0; and, next, reset the core.

If, in step 706, the self-test-passed indicator is not set, the processor will enter a Clear-and-Lock step 712, wherein the processor clears the non-resettable update-approve indicator, (which may already be cleared, depending on the steps that were executed prior to the last reset), set the non-resettable Lock-Flash1-Writes indicator (which may be set), and then activate the Linux layer (to be described hereinbelow, with reference to FIG. 8).

Figure 8:
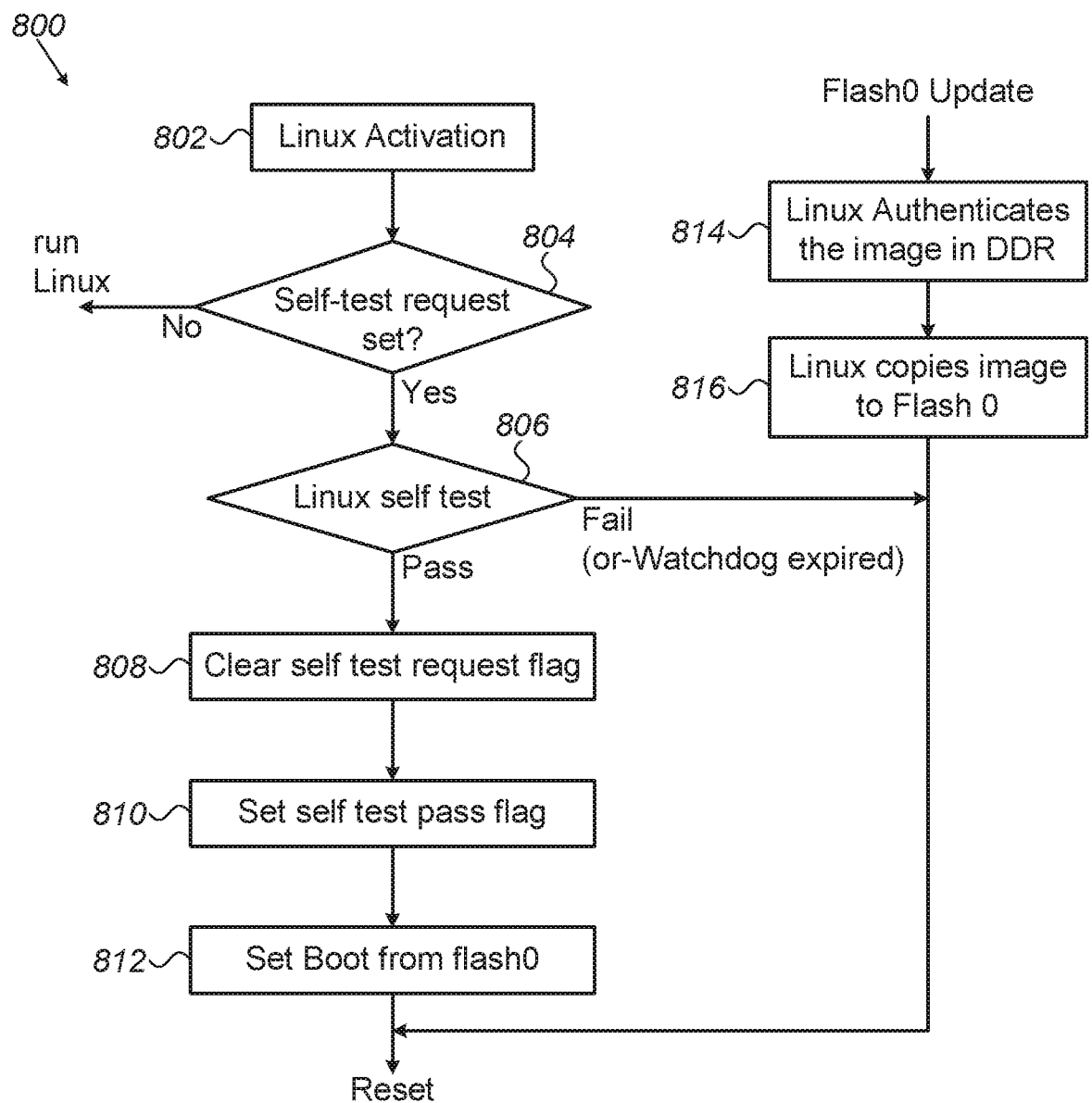
FIG. 8 is a flow chart that schematically illustrates a Linux level bootstrap, in accordance with embodiments of the present invention.

FIG. 8 is a schematic illustration of a flow 800 of the Linux level bootstrap, in accordance with embodiments of the present invention. The flow is executed by processor 102 (FIG. 1). As shown in FIG. 8, Flow 800 has two starting steps.

The flow may start with the activation of the Linux layer, at a Linux-Activation step 802 (which is executed following step 712 (FIG. 7)). Next, at a Checking-self-test-request step 804 the processor checks if the non-resettable self-test-request indicator is set. If the self-test-request indicator is not set, booting completed, and the processor will start running the Linux code (the layers above boot). If the self-test-request indicator is set, the processor will enter a Linux-Self-Test step 806 and execute a self-test that is embedded in the Linux boot code.

If, in step 806 the self-test fails, or a watchdog timer expires, the processor will reset; if the self-test passes, the processor will enter a Clearing-Self-Test-Request step 808 and clear the non-resettable Self-Test-Request indicator; and then enter a Setting-Self-Test-Passed step 810 and set the non-resettable Self-Test-Passed indicator. Lastly, the processor will enter a Setting-Boot-From-Flash0 step 812 wherein the processor sets the non-resettable Boot-from-Flash0/1 indicator to indicate booting from flash0, and, reset the core.

Linux flow 800 can also be entered if the processor receives a new firmware version in runtime; for example, through the internet. The new firmware is loaded into the RAM, and then the processor enters an Authenticating-DDR-Image step 814, wherein the processor authenticates the boot image that is stored in RAM. Next, the processor enters a Copying-Image-to-Flash0 step 816, copies the RAM contents to Flash0, and resets. After reset, the steps that were described above, with reference to FIG. 3 will take effect, further verifying the new firmware (as described above, the authentication of the new firmware that is done in the Linux layer is not trusted) and, if deemed good, updating flash1.

In summary, the methods described herein with reference to FIGS. 3 through 8 facilitate secure booting, in a computer system that comprises two flash devices, by using non-resettable indicators, by adding a self-test condition to the acceptance of the new firmware and by fully trusting level-0 of the boot program only, although all higher levels are hierarchically authenticated. As would be appreciated, the methods described herein are example embodiments. In alternative embodiments, other suitable flows may be used, with different steps and/or different ordering of the steps.

Although the embodiments described herein refer mainly to Linux system, the disclosed techniques may be applicable, mutatis mutandis, to other operating systems, such as Android, iOS and others.

The different elements of processor 102 and controller 104, may be implemented using suitable hardware, such as in one or more Application-Specific Integrated. Circuits (ASICs) or Field-Programmable Gate Arrays (FPGAs), using software, using hardware, or using a combination of hardware and software elements.

In some embodiments, processor 102 comprises one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The embodiments described herein refer mainly to a configuration in which the two versions of firmware (the firmware version that is known to be good, and the firmware version that is in use by the computer system) are stored in two separate memory devices. This configuration, however, is not mandatory. In alternative embodiments, the two firmware versions can be stored in one or more memory devices various forms, e.g., in two memories packaged in the same device package, or even in two different regions of the same memory, wherein one region is deemed more secure than the other.

Although the embodiments described herein mainly address secure boot, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer system, comprising:
one or more memory devices, configured to store (i) a first version of a multi-stage bootstrap program for bootstrapping the computer system, the bootstrap program comprising a self-test program that tests the bootstrap program, and (ii) a second version of the bootstrap program that is known to be trustworthy;
non-resettable memory elements, configured to store non-resettable indicators that are retained regardless of resetting of the computer system, the non-resettable indicators comprising at least (i) a self-test-request indicator that requests running of the self-test program, and (ii) a self-test-passed indicator indicative of whether the self-test program passed or failed; and a processor, configured to retrieve the first version of the bootstrap program, and, if the first version is at least as recent as the trustworthy second version, to bootstrap the computer system securely using the first version and the non-resettable indicators.

2. The computer system according to claim 1, wherein the one or more memory devices comprise a first memory device configured to store the first version, and a second memory device configured to store the second version.

3. The computer system according to claim 1, wherein, if the first version is less recent than the trustworthy second version, the processor is configured to initiate a recovery process that copies the trustworthy second version to replace the first version.

4. The computer system according to claim 1, wherein, if the first version is more recent than the trustworthy second version, the processor is configured to read the self-test-passed indicator, and, if the self-test-passed indicator is cleared, to set the self-test-request indicator and then reset the computer system.

5. The computer system according to claim 1, wherein, if the first version is more recent than the trustworthy second version, the processor is configured to read the self-test-passed indicator and the self-test-request indicator, and, if the self-test-passed indicator is cleared and the self-test-request indicator is set, to run the self-test program, clear the self-test-request indicator, set or clear the self-test-passed indicator depending a result of the self-test program, and then reset the computer system.

6. The computer system according to claim 1, wherein the non-resettable indicators further comprise an update-approve indicator, and wherein, if the first version is more recent than the trustworthy second version, the processor is configured to read the self-test-passed indicator and the update-approve indicator and, if the self-test-passed indicator is set but the update-approve indicator is cleared, to hierarchically authenticate the first version of the bootstrap program, set or clear the update-approve indicator depending a result of authentication of the first version, and then reset the computer system.

7. The computer system according to claim 1, wherein the non-resettable indicators further comprise an update-approve indicator, and wherein, if the first version is more recent than the trustworthy second version, the processor is configured to read the self-test-passed indicator and the update-approve indicator and, if both the self-test-passed indicator and the update-approve indicator are set, to replace the trustworthy second version with the first version, and then reset the computer system.

8. The computer system according to claim 1, wherein at least a memory region storing the second version is write-protected during run-time of the computer system.

9. A method in a computing system, the method comprising:
   storing in one or more memory devices of the computing system (i) a first version of a multi-stage bootstrap program for bootstrapping the computer system, the bootstrap program comprising a self-test program that tests the bootstrap program, and (ii) a second version of the bootstrap program that is known to be trustworthy;
   storing, in non-resettable memory elements of the computing system, non-resettable indicators that are retained regardless of resetting of the computer system, the non-resettable indicators comprising at least (i) a self-test-request indicator that requests running of the self-test program, and (ii) a self-test-passed indicator indicative of whether the self-test program passed or failed; and
   using a processor of the computing system, retrieving the first version of the bootstrap program, and, if the first version is at least as recent as the trustworthy second version, bootstrapping the computer system securely using the first version and the non-resettable indicators.

10. The method according to claim 9, wherein storing the first and second versions comprises storing the first version in a first memory device, and storing the second version in a second memory device.

11. The method according to claim 9, wherein booting the computer system comprises, if the first version is less recent than the trustworthy second version, initiating a recovery process that copies the trustworthy second version to replace the first version.

12. The method according to claim 9, wherein, if the first version is more recent than the trustworthy second version, booting the computer system comprises reading the self-test-passed indicator, and, if the self-test-passed indicator is cleared, setting the self-test-request indicator and then resetting the computer system.

13. The method according to claim 9, wherein, if the first version is more recent than the trustworthy second version, booting the computer system comprises reading the self-test-passed indicator and the self-test-request indicator, and, if the self-test-passed indicator is cleared and the self-test-request indicator is set, running the self-test program, clearing the self-test-request indicator, setting or clearing the self-test-passed indicator depending a result of the self-test program, and then resetting the computer system.

14. The method according to claim 9, wherein the non-resettable indicators further comprise an update-approve indicator, and wherein, if the first version is more recent than the trustworthy second version, booting the computer system comprises reading the self-test-passed indicator and the update-approve indicator and, if the self-test-passed indicator is set but the update-approve indicator is cleared, hierarchically authenticating the first version of the bootstrap program, setting or clearing the update-approve indicator depending a result of authentication of the first version, and then resetting the computer system.

15. The method according to claim 9, wherein the non-resettable indicators further comprise an update-approve indicator, and wherein, if the first version is more recent than the trustworthy second version, booting the computer system comprises reading the self-test-passed indicator and the update-approve indicator and, if both the self-test-passed indicator and the update-approve indicator are set, replacing the trustworthy second version with the first version, and then resetting the computer system.

16. The method according to claim 9, wherein at least a memory region storing the second version is write-protected during run-time of the computer system.

17. A computer software product, the product comprising a tangible non-transitory computer-readable medium in which program instructions are stored, which instructions, when read by a processor in a computing system, cause the processor to:
   store in one or more memory devices of the computing system (i) a first version of a multi-stage bootstrap program for bootstrapping the computer system, the bootstrap program comprising a self-test program that tests the bootstrap program, and (ii) a second version of the bootstrap program that is known to be trustworthy;

store, in non-resettable memory elements of the computing system, non-resettable indicators that are retained regardless of resetting of the computer system, the non-resettable indicators comprising at least (i) a self-test-request indicator that requests running of the self-test program, and (ii) a self-test-passed indicator indicative of whether the self-test program passed or failed; and retrieve the first version of the bootstrap program, and, if the first version is at least as recent as the trustworthy second version, bootstrap the computer system securely using the first version and the non-resettable indicators.

\* \* \* \* \*